United States Patent
Peterson (12) 
(10) Patent No.: US 6,799,253 B1
(45) Date of Patent: Sep. 28, 2004

(54) STOCHASTIC SCRATCHPAD STORAGE MANAGEMENT TECHNIQUE

(75) Inventor: Ronald J. Peterson, Saratoga, CA (US)

(73) Assignee: Oracle Corporation, Redwood Shores, CA (US)

(*) Notice: Subject to any disclaimer, the term of this patent is extended or adjusted under 35 U.S.C. 154(b) by 287 days.

(21) Appl. No.: 10/159,393

(22) Filed: May 30, 2002

(51) Int. Cl.$^7$ .............................................. G06F 12/00
(52) U.S. Cl. ...................... 711/150; 711/132; 711/148; 707/205; 707/206
(58) Field of Search ............................. 711/132, 148, 711/150; 707/205, 206

(56) References Cited

U.S. PATENT DOCUMENTS

| | | | | |
|---|---|---|---|---|
| 5,734,861 A | * | 3/1998 | Cohn et al. | 711/134 |
| 6,430,655 B1 | * | 8/2002 | Courtright et al. | 711/118 |
| 6,470,436 B1 | * | 10/2002 | Croft et al. | 711/206 |
| 6,675,378 B1 | * | 1/2004 | Schmidt | 717/154 |

* cited by examiner

*Primary Examiner*—Donald Sparks
*Assistant Examiner*—Ngoc Dinh
(74) *Attorney, Agent, or Firm*—Ritter, Lang & Kaplan LLP (57) ABSTRACT

Methods and apparatus for dynamically allocating space within virtual memory at run-time while substantially minimizing an associated path length are disclosed. According to one aspect of the present invention, a method for allocating virtual storage associated with a computer system includes creating a scratchpad, allocating a unit of storage space at a current location within the scratchpad, and writing a set of information into the unit of storage space such that the set of information is substantially not tracked. The scratchpad supports allocation of storage space therein, and includes a first pointer that identifies a current location within the scratchpad. Finally, the method includes moving the first pointer in the scratchpad to identify a second location within the scratchpad. The first pointer moves in the first linear space in substantially only a top-to-bottom direction.

24 Claims, 7 Drawing Sheets

STOCHASTIC SCRATCHPAD STORAGE MANAGEMENT TECHNIQUE

BACKGROUND OF THE INVENTION

1. Field of Invention

The present invention relates generally to database systems More particularly, the present invention relates to a storage management technique which reduces the path lengths associated with allocating and freeing storage by implementing a push-only stack.

2. Description of the Related Art

Within any computing system, the amount of memory available for data storage purposes is typically limited. As such, storage management components or subsystems are often included within the computing system to manage the allocation and deallocation of memory space. Such storage management components provide general-purpose support for arbitrary usages of storage in which the storage management components have substantially no knowledge of the semantics of the data that consumes the storage.

Figure 1:
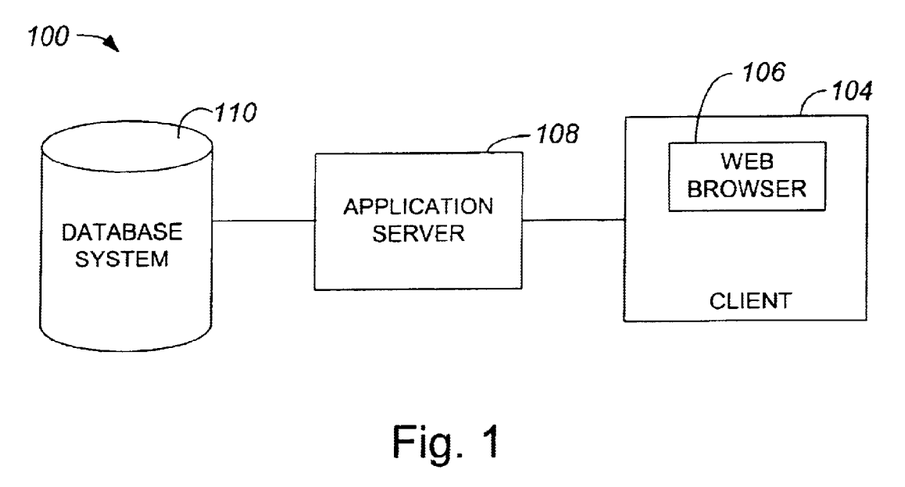
FIG. 1 is a diagrammatic representation of a typical system which uses a storage management system.

A storage management system may generally be contained within an application server or system, a database system, or an operating system. FIG. 1 is a diagrammatic representation of a typical system which uses a storage management system. A system 100 includes a client 104, an application server 108, and a database system 110. Client 104, which may include a web browser 106, communicates with application server 108, or a middle tier, which may contain a web server (not shown). When client 104 communicates with application server 108, application server 108 may access information associated with database system 110. Typically, client 104, application server 108, and database system 1 10 are in communication over a network.

While client 104 and application server 108 may each have an associated operating system (not shown) within which a general-purpose storage management system may be contained, such storage management systems may allow storage to be consumed within client 104 and application server 108. Typically, the performance of such storage management systems may greatly affect the overall performance of their associated systems, i.e., client 104 and application server 108.

Figure 2:
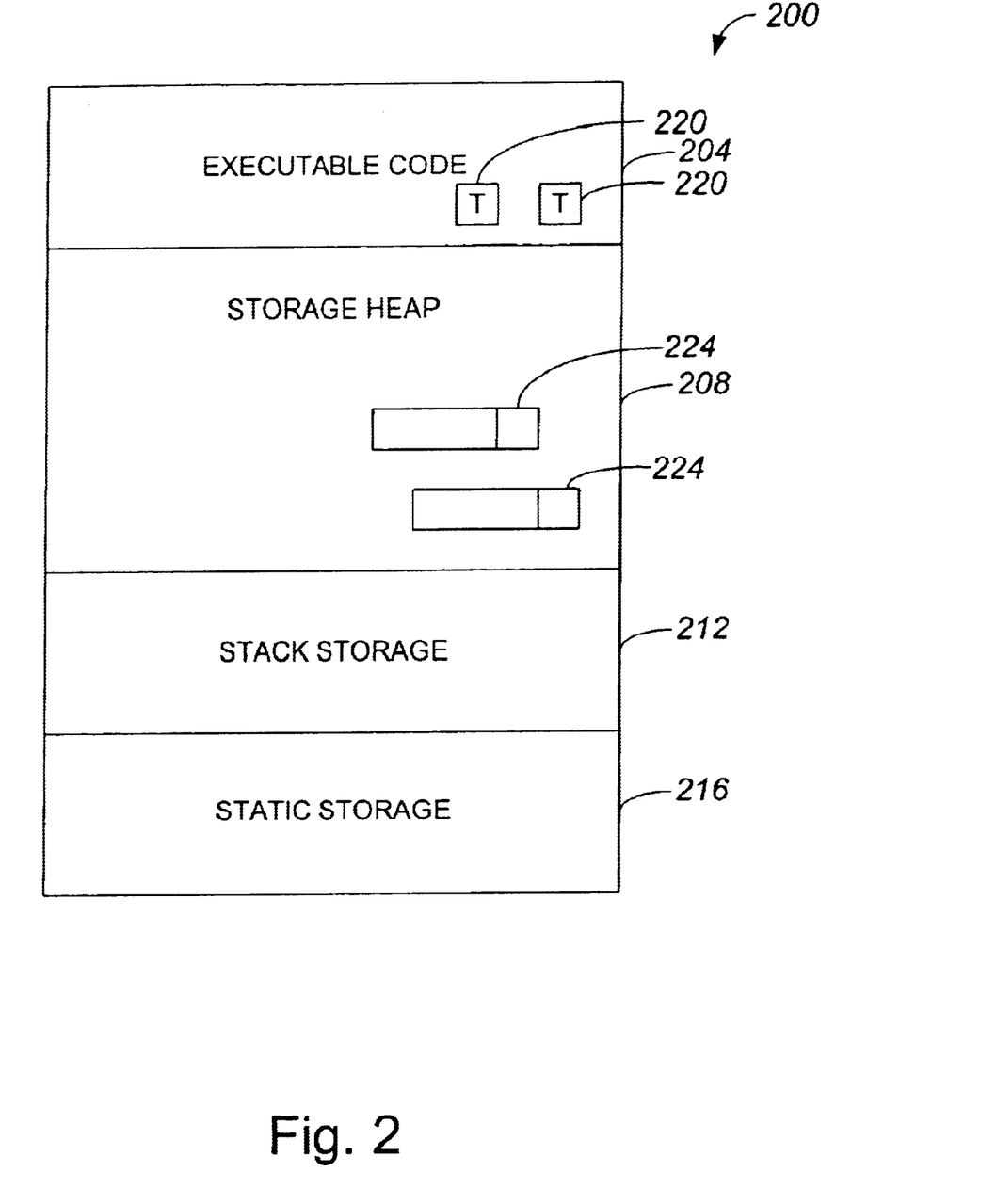
FIG. 2 is a diagrammatic representation of an application address space.

For procedural computing languages such as the C language, storage is typically allocated dynamically for data that is not understood at compile time, e.g., through calls to an operating system service or an application programming interface. The dynamically allocated storage may be allocated from application address space, which may be part of a run-time heap, as will be appreciated by those skilled in the art FIG. 2 is a diagrammatic representation of an application address space. An application address space 200, which maybe managed by an operating system, is typically contained within virtual storage and is partitioned. Virtual storage is generally a resource that is available to a process at run-time, and is located in real storage, e.g., random access memory (RAM), and partially located in auxiliary storage, e.g., disk space.

Executable code 204, which includes threads 220, may be included in application address space 200. Threads 220 are generally associated with concurrent independent tasks 224 or work each with their own storage requirements in a storage heap 208. As will be appreciated by those skilled in the art, dynamic storage occurs in storage heap 208. Application address space 200 also includes stack storage 212 and static storage 216.

When storage heap 208 fills up, i.e., when it is no longer possible to allocate storage in storage heap 208, then a garbage collection process is typically performed to free space within storage heap 208. In order for garbage collection to occur, tasks 224 include accounting information relating to garbage collection processes.

In a typical system, an average of approximately 100 storage allocations or deallocations per second may be considered to be a relatively low number of storage allocations and deallocations. However, at a cost of approximately five hundred to approximately a thousand instructions per storage allocation or deallocation, the number of instructions which execute each second with respect to storage allocations and deallocations may be substantial. That is, the path length associated with each storage allocation or deallocation may be in the range of approximately five hundred to approximately one thousand instructions. As such, when an operating system is required to grow virtual storage through additional page and segment table entries, the number of instructions to be executed may result in such a process being relatively expensive. In high volume transaction processing environments where path length is critical, the high number of instructions to be executed may significantly degrade the overall performance of a system. By way of example, the performance associated with Java Database Conductivity (JDBC) systems such as an Oracle JDBC Driver, available commercially from Oracle Corporation of Redwood Shores, Calif., may be compromised when the number of allocations or deallocations per unit of time is substantial.

Figure 3:
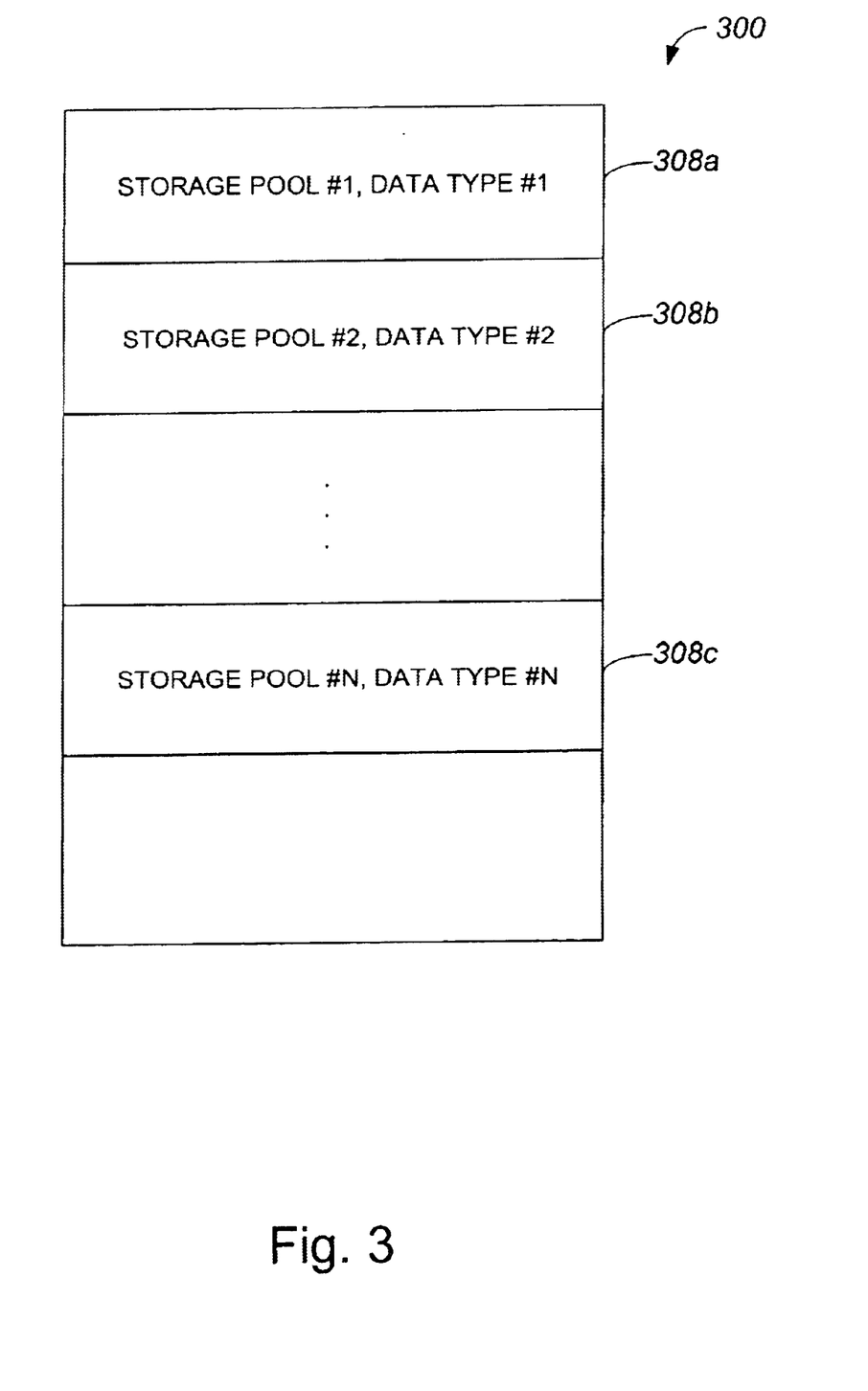
FIG. 3 is a diagrammatic representation of an overall storage pool system.

Reducing the path length associated with storage allocations and deallocations may improve the overall performance of a system, particularly when the system is a high volume transaction processing system. One approach to reducing the path length associated with storage allocations and deallocations may include implementing an overall storage pool system. FIG. 3 is a diagrammatic representation of an overall storage pool system. An overall storage pool system 300, which is located in virtual memory, includes storage pools 308. A first storage pool 308a is arranged to store data of a first type and, hence, has semantics which support data of the first type. Similarly, a second storage pool 308b is arranged to store data of a second type, and has semantics which support data of the second type.

By providing different storage pools, the number of machine instructions for each storage type may be substantially optimized with respect to an appropriate storage pool 308. For example, if it is known that data of a first type is to be stored within first storage pool 308a, then the number of instructions needed to store data of the first type may be optimized accordingly. When data is needed dynamically by code 304, a storage management algorithm may access storage pools 308 to access the data.

Storage pools 308 may often be of a fixed size, i.e., storage pool 308a is often of substantially the same size as storage pool 308b, although the size of individual storage pools 308 may differ based upon the size of data items to be stored. The use of storage pools 308 of a fixed size is generally inefficient, as one storage pool 308 may be completely full, while another storage pool 308 may be relatively empty. Once a storage pool 308 for a data type is full, e.g., when storage pool 308a for a first data type is full, another storage pool 308 is typically allocated to store data of the first type. Allocating an additional storage pool 308 may be relatively expensive. In addition, allocating an additional storage pool 308 while other storage pools 308 such as storage pool 308b for a second data type remain relatively unused is generally a waste of storage.

At least some of the instructions associated with storage allocation and deallocation are related to tracking which allows ownership of data to be determined. For instance, allocating storage associated with procedural languages substantially requires that the allocated storage be accounted for by the owner of the storage such that the allocated storage may be deallocated, or freed, at a later time. That is, information relating to an owner of data that is stored, a location at which the data is stored, and garbage collection is tracked to enable the owner to later free the used storage space for other uses. The overhead associated with tracking, i.e., maintaining tracking information, generally creates a significant performance penalty.

While the use of overall storage pool system 300 may reduce the number of instructions associated with storing data, overall storage pool system 300, as discussed above, may be expensive as storage space associated with storage pools 308 may be used inefficiently, e.g., when one type of data is much more prevalent than another type of data. Further, although the number of instructions which are needed to store data in storage pools 308 may be lower than the number of instructions to store data into a storage heap such as storage heap 208 of FIG. 2, the number of instructions is still relatively high, as instructions associated with tracking stored data are still needed.

Therefore, what is needed is a storage management system and method which enables storage to be allocated and deallocated without requiring a relatively high number of instructions to be executed. More specifically, what is desired is a system which reduces the path length associated with dynamically storing data in virtual storage.

SUMMARY OF THE INVENTION

The present invention relates to dynamically allocating space within virtual memory at run-time while substantially minimizing an associated path length. According to one aspect of the present invention, a method for allocating virtual storage associated with a computer system includes creating a first linear space, allocating a unit of storage space within the first linear space, and writing a first set of information into the unit of storage space such that the first set of information is substantially not tracked. The first linear space supports allocation of storage space therein, and includes a first pointer that is arranged to identify a current location within the first linear space. The unit of storage which is allocated is associated with the current location. Finally, the method includes moving the first pointer in the first linear space to identify a second location within the first linear space. The first pointer moves in the first linear space in substantially only a top-to-bottom direction. In one embodiment, the unit of storage space within the first linear space is arranged not to be freed or reclaimed.

In another embodiment, the size of the first linear space is estimated through determining lifetimes and attributes of substantially all information that is expected to be written into the first linear space. In such an embodiment, lifetimes and attributes of substantially all the information to be written into the first linear space are similar.

Dynamically allocating and freeing storage in a linear space, e.g., a scratchpad, within virtual memory allows for a substantial reduction in path lengths associated with allocating and freeing storage and, further, increases a number of transactions which may be executed per unit of time. The reduction in path lengths is possible because scratchpad memory is substantially never freed. Since scratchpad memory is substantially never freed, there is effectively no need to maintain accounting information or tracking information when data representations are stored in a scratchpad. Therefore, the number of machine instructions associated with allocating and deallocating storage within the scratchpad may be significantly reduced.

According to another aspect of the present invention, a computing system includes a processor, a primary storage that is in communication with the processor, a secondary storage that is also in communication with the processor, and a virtual memory. The virtual memory includes at least a portion of the primary storage and at least a portion of the secondary storage, and also includes at least one scratchpad that functions as a push-only stack that supports dynamic storage allocation. The scratchpad is arranged not to be reclaimed or freed. In one embodiment, the scratchpad is allocated by an application which is executed by the processor to store data representations associated with the application.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

General-purpose storage management systems which allow storage to be allocated and deallocated in virtual memory of a computing system generally require that a relatively high number of machine instructions be executed to allocate and to deallocate storage. As each allocation and deallocation of storage within the virtual memory may require in the range of approximately 500 to approximately 1000 machine instructions, in high volume transaction processing environments, such path lengths may cause a significant degradation in the overall performance of the computing system.

In one embodiment of the present invention, the path length associated with allocating and deallocating storage may be reduced by defining a disposable storage space, in which storage may be allocated but is very rarely, e.g., substantially never, deallocated, that effectively does not require data stored therein to be tracked. The disposable storage space, i.e., a scratchpad, may be a linear space of a fixed size in which storage is allocated or pushed in one direction, and is substantially never popped. Scratchpads are typically associated with representations of data of similar lifetimes and data attributes, and are useful when the size of data stored in or pushed onto the scratchpad is not large.

The use of scratchpads, which are located in virtual memory and are substantially never reclaimed, allows the overall allocation of storage within the scratchpad to occur with relatively few machine instructions. As a scratchpad is substantially never reclaimed, storage associated with the scratchpad typically is not deallocated. In addition, not reclaiming storage associated with the scratchpad also substantially eliminates the need for tracking information to be maintained. Hence, the path length associated with overall storage allocations may be relatively significantly reduced. Reducing the path length associated with storage allocations increases the performance of an overall system, e.g., a high volume transaction processing system, with which a scratchpad is associated. Further, the number of transactions which may be executed per unit of time increases as the path length associated with transactions decreases.

A scratchpad storage management technique may be applied to software associated with a client and software associated with an application server, or, first tier software and second tier software, respectively. That is, scratchpads may be created in virtual memory associated with a client and virtual memory associated with an application server in order to improve the overall performance of the client and the application server.

Figure 4:
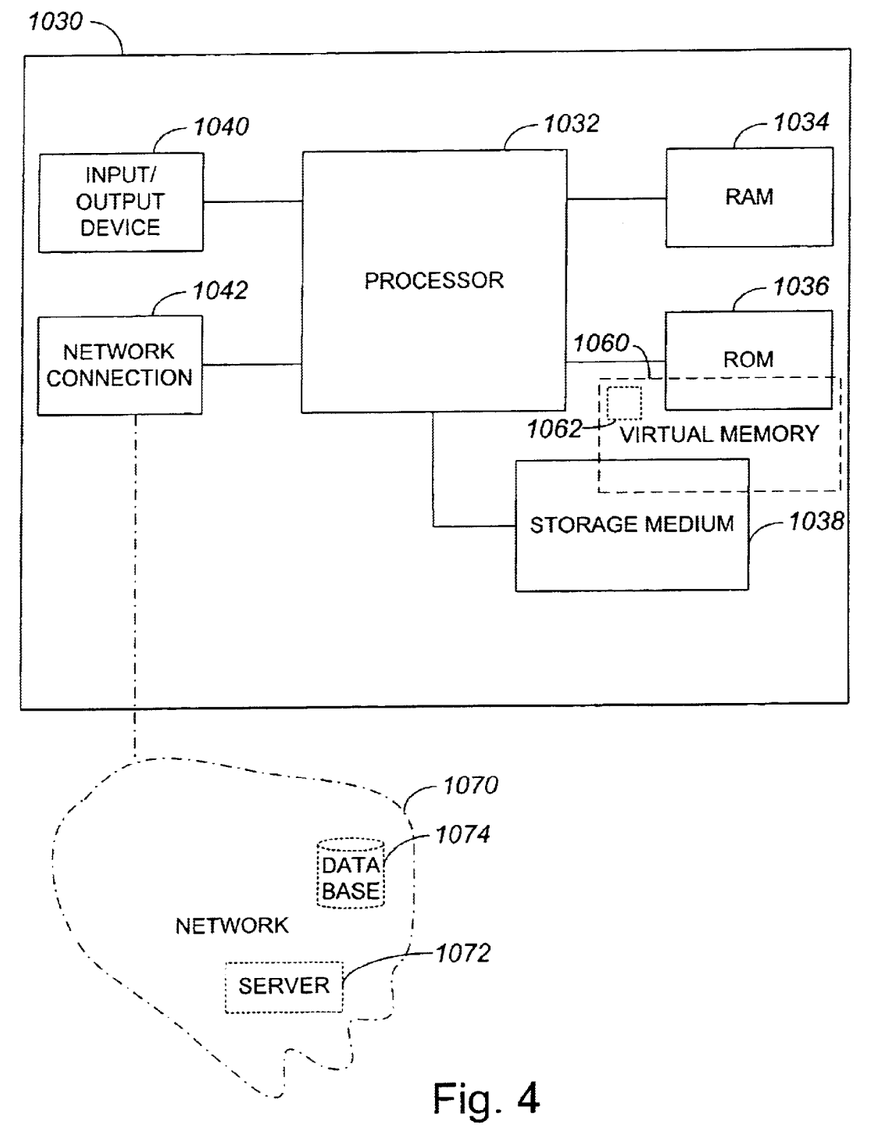
FIG. 4 is a diagrammatic representation of a general-purpose computer system suitable for implementing the present invention.

In general, a scratchpad storage management technique may be implemented with respect to substantially any computer system which allocates storage in virtual memory. FIG. 4 illustrates a typical, general-purpose computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM, e.g., a CD-ROM, acts to transfer data and instructions uni-directionally to the CPU 1032, while RAM is used typically to transfer data and instructions in a bi-directional manner.

Both primary storage devices 1034, 1036 may include substantially any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It should be appreciated that the information retained within the mass memory device 1038, may be incorporated in standard fashion as part of RAM 1034 to form a virtual memory 1060. That is, virtual memory 1060 may be implemented in RAM 1034 and partially in mass memory device 1038. A scratchpad 1062, or disposable storage which effectively does not need to be tracked, may be allocated within virtual storage 1060.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other wellknown input devices such as, of course, other computers. Finally, CPU 1032 optionally may be coupled to a computer or telecommunications network, e.g., a local area network, an internet network or an intranet network, using a network connection as shown generally at 1042. When computer system 1030 is a client system on which a web browser (not shown) is implemented, network connection 1042 may enable the client system to communicate with a network 1070 or, more specifically, an application server 1072 and a database 1074 associated with network 1070. With network connection 1042, it is contemplated that the CPU 1032 might receive information from network 1070, or might output information to network 1070. Such information, which is often represented as a sequence of instructions to be executed using CPU 1032, may be received from and outputted to the network 1070, for example, in the form of a computer data signal embodied in a carrier wave. The above-described devices and materials will be familiar to those of skill in the computer hardware and software arts.

Figure 5A:
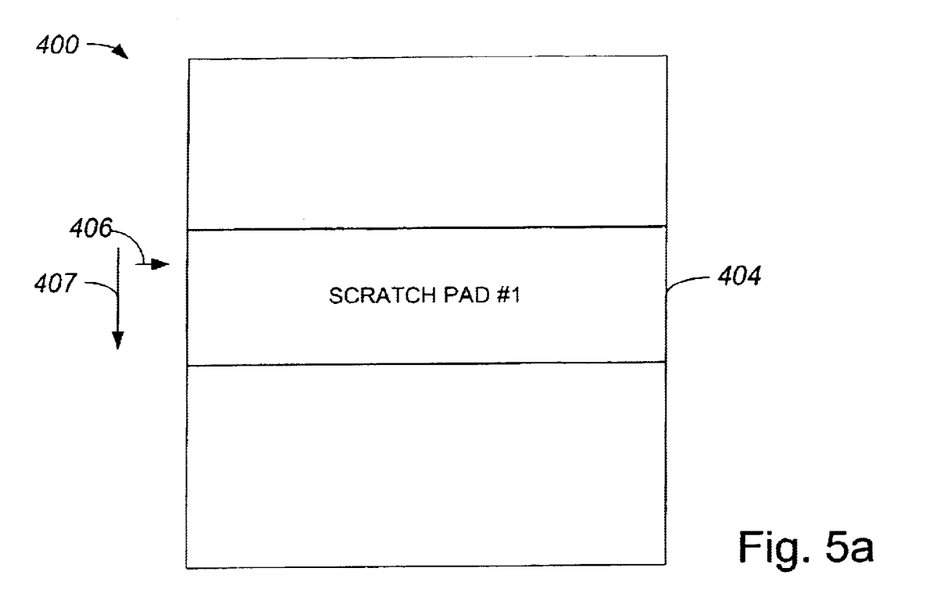
FIG. 5a is a diagrammatic representation of a scratchpad stored in virtual memory in accordance with an embodiment of the present invention.

FIG. 5a is a diagrammatic representation of a scratchpad stored in virtual memory in accordance with an embodiment of the present invention. A scratchpad 404 or a scratchpad frame, which is arranged to store data that has similar properties and similar lifetimes, is stored in virtual memory 400, and includes a storage pointer 406 which identifies a current position within scratchpad 404 to which data may be written. That is, pointer 406 points to a current storage address to be used to store data. As scratchpad 404 is effectively a push-only stack, ie., is substantially never popped, pointer 406 moves in a downward direction 407 with respect to scratchpad 404.

Figure 5B:
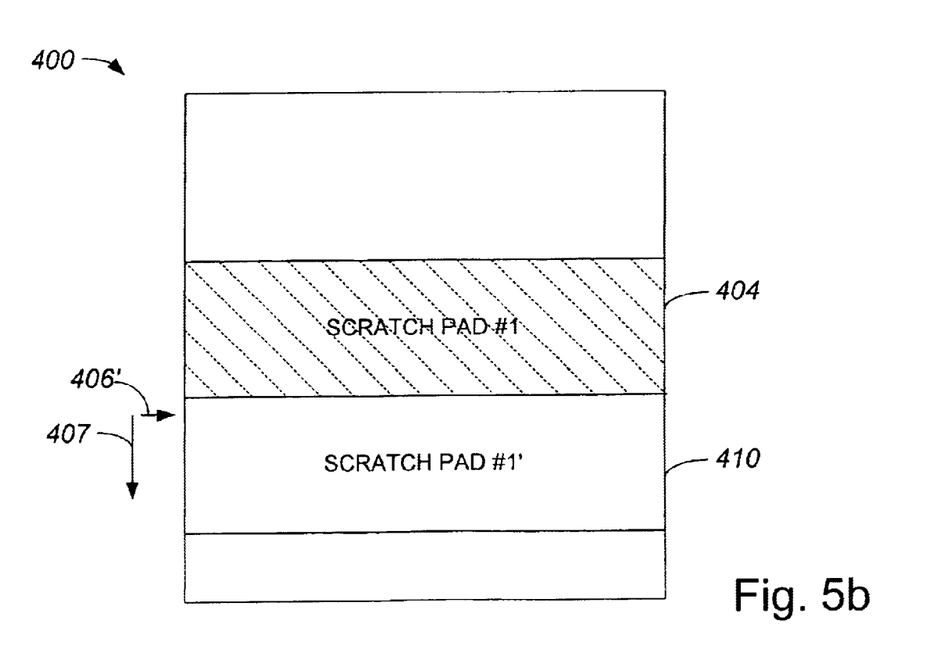
FIG. 5b is a diagrammatic representation of a second scratchpad stored in virtual memory in accordance with an embodiment of the present invention.

Once scratchpad 404 is exhausted, i.e., once scratchpad 404 is full and may not support additional push operations, storage is generally allocated from some other source. By way of example, an additional scratchpad 410 may be allocated once scratchpad 404 is exhausted, as shown in FIG. 5b. Although scratchpad 410, which includes a pointer 406' to a current location into which data may be written, is shown as being contiguous with respect to scratchpad 404, scratchpad 410 may instead be non-contiguous with respect to scratchpad 404, as contiguous space in virtual memory 400 may not be available. When scratchpad 410 is allocated, information associated with scratchpad 410 may be recorded such that the fact that scratchpad 410 has been allocated for use may be known, e.g., known to an owner or an application which has allocated scratchpad 404 and scratchpad 410.

Typically, the allocation of an additional scratchpad 410 may be unnecessary, as the size of scratchpad 404 may be "tuned" or otherwise determined such that scratchpad 404 will rarely be exhausted. In one embodiment, diagnostics may be used to determine or estimate a size of scratchpad 404 that is appropriate for a particular set of storage requirements, i.e., for a partition, such that the capacity of scratchpad 404 may be exceeded no more than approximately five percent of the time. Diagnostic, or stochastic, techniques may be implemented by a software developer while testing an application, and diagnostic data obtained through implementing the diagnostic techniques may be written into the application, e.g., such that the application is aware of how large scratchpad 404 should be to ensure that scratchpad 404 is exhausted less than approximately five percent of the time. Alternatively, such diagnostic data may be dynamically updated by storing stochastic data that may be read by an application each time the application executes or, more specifically, each time the application allocates a scratchpad.

Figure 6A:
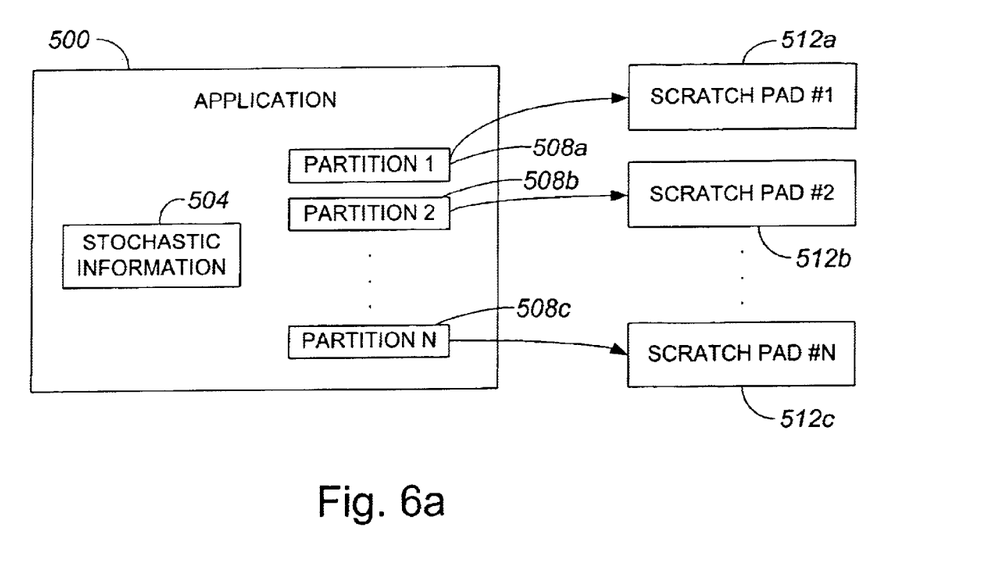
FIG. 6a is a diagrammatic representation of an application which may partition storage requirements and allocate scratchpads in accordance with an embodiment of the present invention.

If an application, e.g., a client application, either knows or is able to estimate storage requirements for a period of time, and may partition substantially all storage requirements into classes or pools that have similar properties and lifetimes, a separate scratchpad may be allocated for each partition. Further, the separate scratchpads may be managed substantially independently of all other scratchpads. FIG. 6a is a diagrammatic representation of an application which may partition storage requirements and allocate scratchpads in accordance with an embodiment of the present invention. An application 500, which may execute on a client or on an application server, has access to stochastic information 504 which includes, but is not limited to, information that may be used to determine the size of scratchpads 512 that are to be allocated by application 500. Application 500 may include partitions 508 which are classes or pools of storage requirements. In one embodiment, partitions 508 are formed based on storage requirements that have similar properties. That is, partitions 508 may be formed based on storage requirements for data or information that is of the same data type, has similar attributes, or has similar lifetimes.

Application 500 may allocate scratchpads 512 which correspond to partitions 508 as scratchpads 512 are first needed. That is, a scratchpad 512 may not be allocated until it is actually needed. Typically, however, application 500 preallocates scratchpads 512 for partitions 508 substantially as soon as application 500 is initialized or begins to execute. Each partition 508 may be assigned to a scratchpad 512 that is of a size that is substantially equal to the expected size of the storage requirements for partition 508. By way of example, partition 508a may be assigned to scratchpad 512a, while partition 508b may be assigned to scratchpad 512b. It should be appreciated that although scratchpads 512 may be of approximately the same size, the size of each scratchpad 512 generally varies.

Figure 6B:
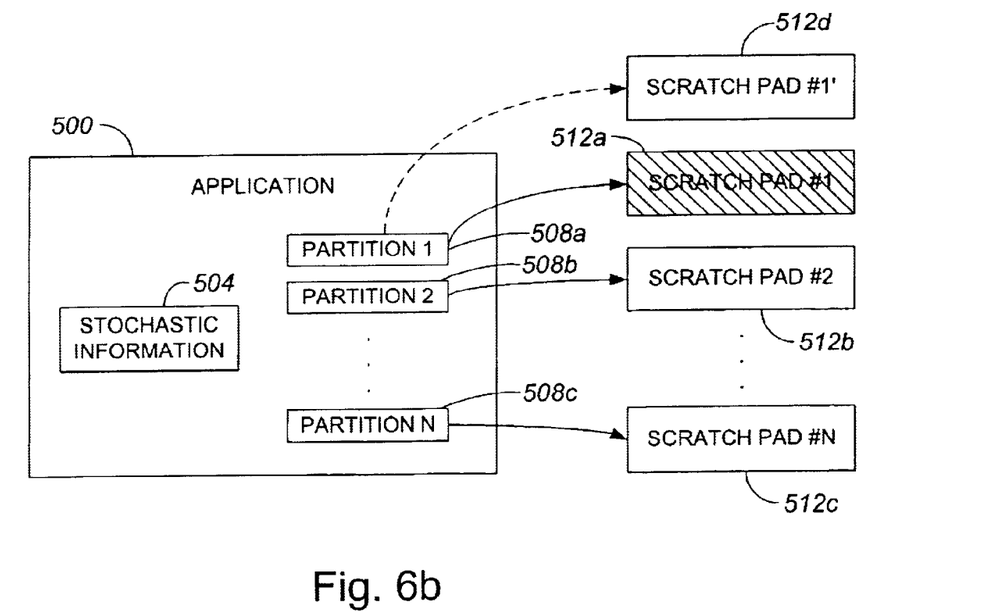
FIG. 6b is a diagrammatic representation of an application, i.e., application 500 of FIG. 6a, which may partition storage requirements and allocate new scratchpads to replace exhausted scratchpads in accordance with an embodiment of the present invention.

When application 500 requires storage, an appropriate partition 508 for the information or data to be stored is identified. Then, storage may be allocated in the scratchpad 512 which corresponds to the appropriate partition 508, e.g., storage may be allocated in scratchpad 512a for partition 508a, until the corresponding scratchpad 512 is exhausted. If scratchpad 512a is exhausted, for example, scratchpad 512d may be allocated for use with partition 508a, as shown in FIG. 6b. As discussed above, however, it is generally unlikely that scratchpads 512 will be exhausted, as with knowledge of data requirements and usage, scratchpads 512 may be sized appropriately.

As storage space or memory within scratchpads 512 is generally not freed, there are typically no instructions associated with freeing memory within scratchpads 512. Hence, the number of instructions, or the path length, associated with allocating memory space within allocated scratchpads 512 may be substantially minimized. In one embodiment, allocating storage space within a scratchpad 512 generally requires fewer than ten instructions, e.g., between five and ten instructions. Therefore, the overall performance of a system which uses scratchpads 512 may be significantly improved, as the number of instructions associated with allocating and deallocating storage space is reduced.

Typically, the memory associated with scratchpads 512 is not freed, as discussed above. Since memory associated with scratchpads 512 is not freed, the memory associated with scratchpads 512 is effectively not reclaimed. Hence, scratchpads 512 generally are not tracked. As a result, the information or a representation of data stored in scratchpads 512 may be stored without accounting information that includes information which is used by a garbage collector that reclaims memory, or information which identifies an owner of the stored information.

In lieu of reclaiming scratchpads 512 such as a scratchpad 512a, each time an owner is reused and partition 508a is reused, scratchpad 512a may be reset. Resetting scratchpad 512a allows scratchpad 512a to be reused, and typically involves resetting the storage pointer (not shown) which identifies the current storage address to be used within scratchpad 512a to the beginning of scratchpad 512a.

Figure 7:
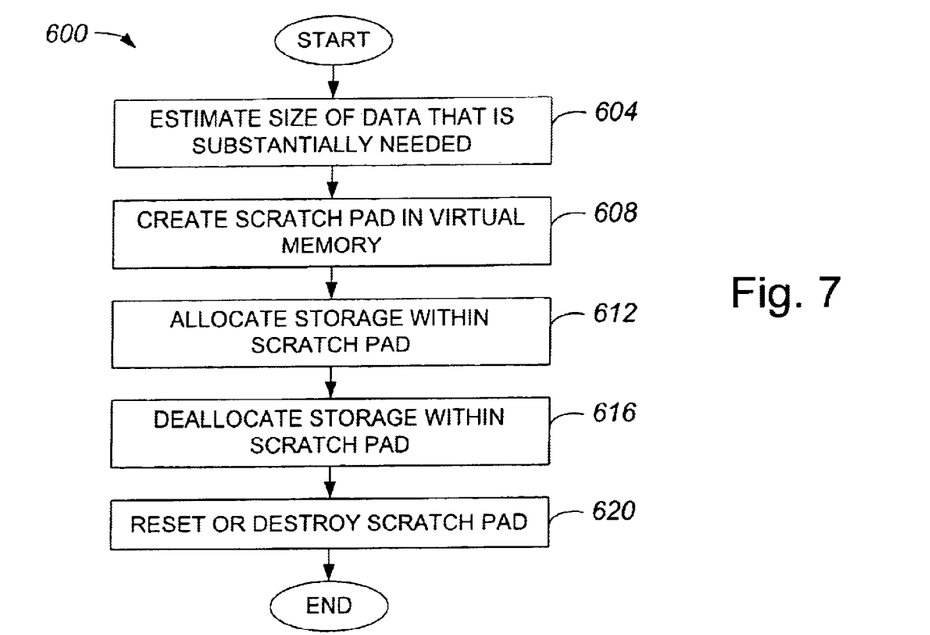
FIG. 7 is a process flow diagram which illustrates the steps associated with the execution of an application which creates scratchpads in accordance with an embodiment of the present invention.

As previously mentioned, an application may estimate the size of storage needed to support data requirements, i.e., determine the appropriate size of a scratchpad to be associated with a particular partition, and allocate a scratchpad once the application begins to execute. With reference to FIG. 7, the steps associated with the execution of an application will be described in accordance with an embodiment of the present invention. A process 600 of executing an application begins at step 604 in which the size of data substantially required by the application is estimated. Estimating the size of data typically occurs at run-time while the application is being initialized, and may include determining how much storage space is expected to be needed by the application. In one embodiment, estimating the size may include reading from an external field of a file which contains information relating to an estimated size. Alternatively, estimating the size may include accessing a file that is separate from the application and contains information relating to the estimated size of the data.

Once the size of the application data is estimated, a scratchpad may be created, or allocated, in virtual memory in step 608. Such a scratchpad may be created while the application is being initialized. Although different scratchpads may be created for data with different storage requirements, as discussed above with respect to FIG. 6a, for ease of discussion, a single scratchpad is created in step 608. After the scratchpad is created, storage may be allocated within the scratchpad in 612 when the application executes and requires storage to be allocated. Allocating storage within the scratchpad may include moving the storage pointer to a new storage address to be used each time information is written into the scratch pad. One method of allocating storage within a scratchpad will be described below with respect to FIG. 8.

After storage has been allocated within the scratchpad, and no additional data is to be allocated, then storage within the scratchpad is deallocated in step 616. Deallocating the storage may include executing a "No Op" or an instruction with no overhead, as the storage pointer does not move, i.e., the storage pointer does not pop. Once storage is deallocated, the scratchpad is either reset or destroyed in step 620. Resetting the scratchpad includes moving the storage pointer to a first storage address associated with the scratchpad, and allows the scratchpad to be reused for the allocation of storage. The scratchpad may be destroyed, on the other hand, when data in the scratchpad will not be needed again, and the memory space occupied by the scratchpad may be returned to the overall operating system. Typically, the application will know when it is appropriate to reset the scratchpad and when it is appropriate to destroy the scratchpad. Once the scratchpad is either reset or destroyed, the execution of the application is completed.

Figure 8:
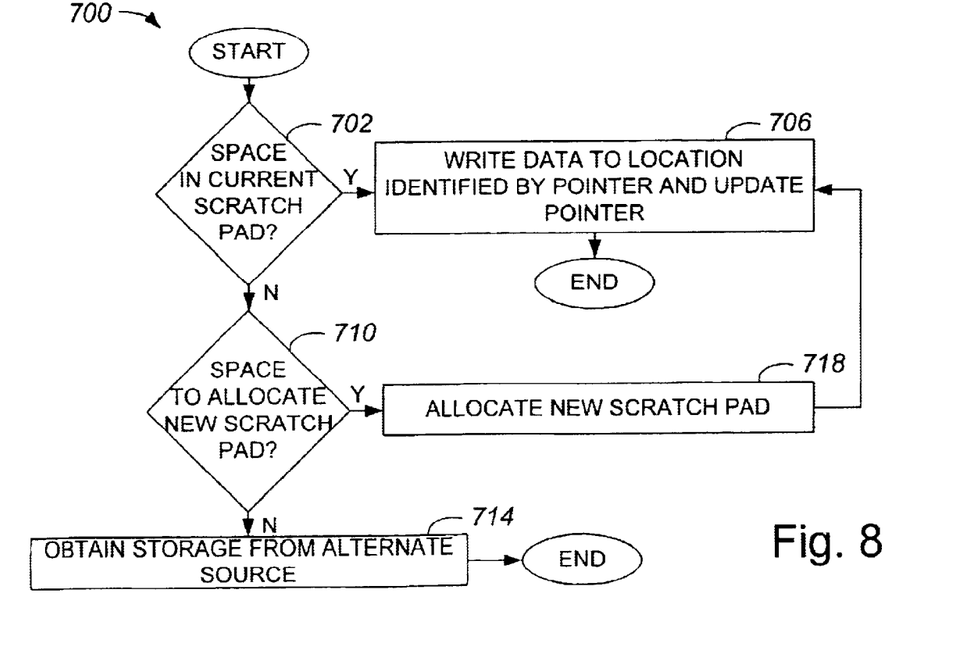
FIG. 8 is a process flow diagram which illustrates the steps associated with allocating storage within a scratchpad, i.e., step 612 of FIG. 7, in accordance with an embodiment of the present invention.

FIG. 8 is a process flow diagram which illustrates the steps associated with allocating storage within a scratchpad, i.e., step 612 of FIG. 7, in accordance with an embodiment of the present invention. A process 700 of allocating storage within a scratchpad begins at step 702 in which a determination is made regarding whether there is space available in the current scratchpad. That is, it is determined whether data may be written into scratch pad. If it is determined that there is adequate space available in the current scratchpad, then process flow moves to step 706 in which data is written into the location identified by the storage pointer. Once the data is written to the location identified by the pointer, the process of allocating storage within the scratchpad is completed.

Alternatively, if it is determined that there is not enough space in the current scratchpad for storage to be allocated therein, then the indication is that an additional storage source is to be used to store data. It should be appreciated that since the current scratchpad is typically allocated to be of a size which is expected to be sufficient for storing data associated with the application, there is generally enough space in the current scratchpad for storage to be allocated within the current scratchpad. If, however, there is not enough space available in the current scratchpad, process flow moves from step 702 to step 710 in which it is determined whether there is space available to allocate a new scratchpad. When it is determined that there is space available to allocate a new scratchpad, then a new scratchpad is allocated in step 718. Once the new scratchpad is allocated, data may be written to the location identified by the storage pointer, i.e., the storage pointer which identifies the current storage address to be used in the new scratchpad, in step 706. The pointer may also be updated as appropriate in step 706. After the data is written, the process of allocating storage within a scratchpad is completed.

If the determination in step 710 is that there is not adequate space to support the allocation of a new scratchpad, then storage may be obtained from an alternate source. In other words, storage that is not part of a scratchpad may be obtained for the storage of data. Such alternate storage may include, for example, the operating system. After alternate storage is obtained, the process of allocating storage within a scratchpad is completed.

As discussed above, the size of a scratchpad is generally allocated such that the storage space associated with the scratchpad is substantially only exhausted less than a particular percentage of time, e.g., less than approximately five percent of the time. Typically, the estimated size of a scratchpad may be determined by an application writer who is aware of what data types are associated with the application, and may track a pattern or semantics associated with the application by running profiles associated with the application. In other words, an application writer or developer may obtain historical stochastic or statistical information relating to data allocation associated with the application, and may code such information into the application. Alternatively, the application writer may provide information relating to an estimated size for a scratchpad in a separate file that may be read or otherwise accessed by the application.

When it is determined by a user that the capacity of scratchpads allocated by an application are consistently exceeded, as for example more than approximately ten percent of the time, the user may track the diagnostics associated with the application, and provide diagnostic information to the application writer. The application writer may then retune the application to reduce the likelihood of exhausting a scratchpad by reestimating or refining the size of the scratchpad to be created when the application is initialized. Alternatively, when information relating to an estimated size for a scratchpad is maintained in a file that is separate from the application, a user may determine a new estimated size of the scratchpad from the diagnostic information, and update the file. In one embodiment, information relating to the estimated size of a scratchpad that is contained in such a file may be arranged to be dynamically updated by the application to allow the likelihood that a scratchpad is exhausted to remain below approximately five percent.

Although only a few embodiments of the present invention have been described, it should be understood that the present invention may be embodied in many other specific forms without departing from the spirit or the scope of the present invention. By way of example, scratchpad storage management techniques have been described as being suitable for use with respect to transaction and middleware software. That is, scratchpad storage management techniques have been described as being used with respect to software associated with a client and software associated with an application server. It should be understood, however, that scratchpad storage management technique s may generally be applied to a database system or substantially any other suitable system to improve the performance of the system.

The number of scratchpads which may be allocated by an application may vary. For example, when an application has multiple partitions of data based on storage requirements, i.e., when an application partitions data into groups based on common properties and lifetimes, each partition may have an associated scratchpad. For an embodiment in which an application does not partition data into groups, the application may create a single scratchpad to be used when the application executes.

The number of instructions needed to allocate storage within a scratchpad may also vary widely. While less than five to ten instructions has been described as being suitable for obtaining storage space within a scratchpad, it should be appreciated that in some cases, more instructions may be needed. For instance, more instructions may be needed to allocate storage space within a scratchpad that has substantially only been allocated because an initially allocated scratchpad has been exhausted.

Scratchpads may be included in virtual memory which also includes storage pools, i.e., an application may create scratchpads as well as storage pools for use in storing data. Alternatively, scratchpads may also be substantially mixed with other types of dynamic storage mechanisms.

In general, the steps associated with the processes of the present invention may vary. That is, steps may be added, removed, reordered, and modified without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for allocating virtual storage associated with a computer system, the virtual storage being allocated by an application, the application being arranged to execute on the computer system, the method comprising:

creating a first linear space, the first linear space being arranged to support allocation of storage space within the first linear space, the first linear space including a first pointer that is arranged to identify a current location within the first linear space;

allocating a unit of storage space within the first linear space, the unit of storage space being associated with the current location;

writing a first set of information into the unit of storage space within the first linear space, wherein the first set of information is substantially not tracked; and moving the first pointer in the first linear space to identify a second location within the first linear space, wherein the first pointer moves in the first linear space in substantially only a top-to-bottom direction.

2. The method of claim 1 wherein the unit of storage space within the first linear space is arranged not to be freed.

3. The method of claim 1 further including:

estimating a size of the first linear space, wherein estimating the size of the first linear space includes determining lifetimes and attributes of substantially all information to be written into the first linear space.

4. The method of claim 3, wherein the lifetimes and the attributes of substantially all the information to be written into the first linear space are similar.

5. The method of claim 1 further including:

creating a second linear space, the second linear space being arranged to support allocation of storage space within the second linear space in the top-to-bottom direction, the second linear space including a second pointer that is arranged to identify a current location within the second linear space.

6. The method of claim 5 wherein the first linear space is arranged to store information with a first type of storage requirement and the second linear space is arranged to store information with a second type of storage requirement.

7. The method of claim 5 further including:

estimating a size of the first linear space, wherein the size of the first linear space is estimated based on the first type of storage requirement; and estimating a size of the second linear space, wherein the size of the second linear space is estimated based on the second type of storage requirement.

8. The method of claim 5 further including:

determining when the first linear space is substantially full, wherein the second linear space is created when it is determined that the first linear space is substantially full.

9. The method of claim 1 wherein the first linear space is a scratchpad, the scratchpad being arranged to function as a push-only stack.

10. A storage management system comprising:

computer code for creating a first linear space in a virtual memory, the first linear space being arranged to support allocation of storage space within the first linear space in a top-to-bottom direction, the first linear space including a first pointer that is arranged to identify a current location within the first linear space;

computer code for allocating a unit of storage space within the first linear space, the unit of storage space being associated with the current location;

computer code for writing a first set of information into the unit of storage space within the first linear space, wherein the first set of information is substantially not tracked;

computer code for moving the first pointer in the first linear space to identify a second location within the first linear space, wherein the computer code for moving the first pointer in the first linear space moves the first pointer in a top-to-bottom direction; and a computer-readable medium that stores the computer codes.

11. The storage management system of claim 10 wherein the unit of storage space within the first linear space is arranged not to be freed.

12. The storage management system of claim 11 further including:

computer code for estimating a size of the first linear space, wherein the computer code for estimating the size of the first linear space includes computer code for determining storage requirements of substantially all information to be written into the first linear space.

13. The storage management system of claim 12, wherein the storage requirements of substantially all the information to be written into the first linear space are similar.

14. The storage management system of claim 10 further including: computer code for creating a second linear space, the second linear space being arranged to support allocation of storage space within the second linear space in the top-to-bottom direction, the second linear space including a second pointer that is arranged to identify a current location within the second linear space.

15. The storage management system of claim 14 wherein the first linear space is arranged to store information with a first type of storage requirement and the second linear space is arranged to store information with a second type of storage requirement.

16. The storage management system of claim 14 further including:

computer code for estimating a size of the first linear space, wherein the computer code for estimating the size of the first linear space estimates the size of the first linear space based on the first type of storage requirement; and computer code for estimating a size of the second linear space, wherein the computer code for estimating the size of the second linear space estimates the size of the second linear space based on the second type of storage requirement.

17. The storage management system of claim 14 further including:

computer code for determining when the first linear space is substantially full, wherein the computer code for creating the second linear space is arranged to create the second linear space when it is determined that the first linear space is substantially full.

18. A computing system comprising:

a processor;

a primary storage, the primary storage being in communication with the processor;

a secondary storage, the secondary storage being in communication with the processor; and a virtual memory, the virtual memory including at least a portion of the primary storage and at least a portion of the secondary storage, wherein the virtual memory includes at least one scratchpad, the scratchpad being arranged as a push-only stack that supports dynamic storage allocation, the scratchpad further being arranged not to be reclaimed.

19. The computing system of claim 18 further including:

computer code that causes the scratchpad to be created, the processor being arranged to execute the computer code, the computer code that causes the scratchpad to be created further including computer code that is arranged to estimate a size of the scratchpad before the scratchpad is created, wherein the size of the scratchpad is estimated based upon attributes associated with data to be stored in the scratchpad.

20. The computing system of claim 19 wherein the size of the scratchpad is estimated such that the probability that the scratchpad is exhausted is less than or equal to a predetermined threshold.

21. The computing system of claim 18 further including:

computer code that causes storage to be allocated in the scratchpad, the processor being arranged to execute the computer code, wherein when the storage is allocated in the scratchpad, a representation of data is stored in the scratchpad.

22. The computing system of claim 21 wherein the scratchpad includes a pointer, the pointer being arranged to identify a current address location within the scratchpad.

23. The computing system of claim 22 wherein when the computer code that causes the storage to be allocated in the scratchpad includes computer code that causes the data representation to be stored in the scratchpad at the current address location.

24. The computing system of claim 18 further including an application arranged to be executed by the processor, wherein the application is arranged to allocate storage within the scratchpad to store a data representation associated with the application.

* * * * *